(12) United States Patent
Atkins et al.

(10) Patent No.: US 9,820,074 B2
(45) Date of Patent: Nov. 14, 2017

(54) MEMORY MANAGEMENT TECHNIQUES AND RELATED SYSTEMS FOR BLOCK-BASED CONVOLUTION

(71) Applicant: Apple Inc., Cupertino, CA (US)

(72) Inventors: Joshua Atkins, Pacific Palisades, CA (US); Adam Strauss, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/777,516

(22) PCT Filed: Mar. 14, 2014

(86) PCT No.: PCT/US2014/029864
§ 371 (c)(1),
(2) Date: Sep. 15, 2015

(87) PCT Pub. No.: WO2014/145150
PCT Pub. Date: Sep. 18, 2014

(65) Prior Publication Data
US 2016/0037281 A1 Feb. 4, 2016

Related U.S. Application Data

(60) Provisional application No. 61/801,314, filed on Mar. 15, 2013.

(51) Int. Cl.
*H04S 7/00* (2006.01)
*G06F 3/06* (2006.01)
*G06F 17/15* (2006.01)

(52) U.S. Cl.
CPC .............. *H04S 7/30* (2013.01); *G06F 3/064* (2013.01); *G06F 3/0604* (2013.01);
(Continued)

(58) Field of Classification Search
CPC .... H04S 7/30; H04S 2400/03; H04S 2420/01; H04S 2420/07; G06F 3/0604;
(Continued)

(56) References Cited

U.S. PATENT DOCUMENTS 5,502,747 A  3/1996 McGrath
6,625,629 B1  9/2003 Garcia
(Continued)

FOREIGN PATENT DOCUMENTS

EP  1879293 A2  1/2008

OTHER PUBLICATIONS

Sreenivasarao, et al. Real-time DSP Implementation of Audio Crosstalk Cancellation Using Mixed Uniform Partitioned Convolution. Signal Processing: An International Journal (SPIJ), vol. 6, Issue 4, 2012.
(Continued)

*Primary Examiner* — Sonia Gay
(74) *Attorney, Agent, or Firm* — Ganz Pollard LLC

(57) ABSTRACT

A processor can be associated with a memory for storing convolution data. A plurality of M filters from a corresponding plurality of M input channels to a selected one output channel can be provided, wherein each filter can be represented by a corresponding index, m. Each of the M filters can be partitioned into K respective filter partitions, wherein each respective filter partition can be represented by a corresponding index, k. A frequency-domain representation of each filter partition can be provided, wherein each frequency-domain representation of a filter partition comprises N frequency bins and a corresponding frequency-domain filter coefficient, wherein each respective frequency bin can be represented by a corresponding index, n. The memory can store such information in an arrangement suitable for the processor to concurrently receive sufficient information to
(Continued)

concurrently convolve a frame of each input signal with the respective filters.

24 Claims, 5 Drawing Sheets

(52) U.S. Cl.
CPC .......... *G06F 3/0659* (2013.01); *G06F 3/0673* (2013.01); *G06F 17/156* (2013.01); *H04S 2400/03* (2013.01); *H04S 2420/01* (2013.01); *H04S 2420/07* (2013.01)

(58) Field of Classification Search
CPC ...... G06F 3/064; G06F 3/0673; G06F 17/156; H03H 21/0012; H03H 21/0027; H03H 21/0043; H03H 21/0025
See application file for complete search history.

(56) References Cited

U.S. PATENT DOCUMENTS

| | | | |
|---|---|---|---|
| 2008/0126461 A1* | 5/2008 | Christoph | H03H 17/0213 708/403 |
| 2009/0180558 A1 | 7/2009 | Ma | |
| 2010/0228810 A1* | 9/2010 | Han | H03H 21/0027 708/322 |
| 2010/0235419 A1 | 9/2010 | Yamamoto | |
| 2010/0293214 A1* | 11/2010 | Longley | G06F 17/156 708/313 |

OTHER PUBLICATIONS

Wefers, et al. High-Performance Real-Time Fir-Filtering Using Fast Convolution on Graphics Hardware. Proc. of the 13th Int. Conference on Digital Audio Effects (DAFx-10), Sep. 6-10, 2010, Graz, Austria.
Wefers, et al. Optimal Filter Partitions for Real-Time Fir Filtering Using Uniformly-Partitioned Fft-Based Convolution in the Frequency-Domain. Proc. of the 14th International Conference on Digital Audio Effects (DAFx-11), Sep. 19-23, 2011, Paris, France.
Gardner. Efficient Convolution without Input-Output Delay. J. Audio Eng. Soc., vol. 43, No. 3, Mar. 1995.
Armelloni, et al. Implementation of Real-Time Partitioned Convolution on a Dsp Board. 2003 IEEE Workshop on Applications of Signal Processing to Audio and Acoustics. Oct. 19-22, 2003, New Paltz, NY.
Garcia. Optimal Filter Partition for Efficient Convolution with Short Input/Output Delay. Audio Engineering Society Convention Paper 5660. Presented at the 113th Convention. Oct. 5-8, 2002, Los Angeles, CA.
Torger, et al. Real-Time Partitioned Convolution for Ambiophonics Surround Sound. IEEE Workshop on Applications of Signal Processing to Audio and Acoustics. Oct. 21-24, 2001, New Paltz, New York.
Miller, et al Recent Developments in Slab: A Software-Based System for Interactive Spatial Sound Synthesis. Proceedings of the 2002 International Conference on Auditory Display, Jul. 2-5, 2002, Kyoto, Japan.
Battenberg et al. Implementing Real-Time Partitioned Convolution Algorithms on Conventional Operating Systems. Proc. of the 14th Int. Conference on Digital Audio Effects (DAFx-11). Sep. 19-23, 2011, Paris, France.
Kulp. Digital Equalization Using Fourier Transform Techniques. Presented at the 85th Convention of the Audio Engineering Society. Nov. 3-6, 1988, Los Angeles, CA.
Rush. Convolution Engine Utilizing NVIDIA's G80 Processor EEC 277 Project. Mar. 13, 2007.
Primavera, et al. An Efficient DSP-Based Implementation of a Fast Convolution Approach with non Uniform Partitioning. 5th European DSP in Education and Research Conference, Sep. 13-14, 2012, Amsterdam, Netherlands.
Methods for the Subjective Assessment of Small Impairments in Audio Systems Including Multichannel Sound Systems. 1994-1997.
Fulop, et al. Reviews of Acoustical Patents. J. Acoust. Soc. Am. 133 (2). Feb. 2013.
Fulop, et al. Reviews of Acoustical Patents. J. Acoust. Soc. Am. 133 (1). Jan. 2011.
International Search Report and Written Opinion of the International Searching Authority in PCT/US14/29864 dated Jul. 29, 2014.

* cited by examiner

MEMORY MANAGEMENT TECHNIQUES AND RELATED SYSTEMS FOR BLOCK-BASED CONVOLUTION

RELATED APPLICATIONS

This application claims the benefit of and priority to U.S. Patent Application No. 61/801,314, filed Mar. 15, 2013, which patent application is hereby incorporated by reference as if recited in full herein for all purposes.

BACKGROUND

This application, and the innovations and related subject matter disclosed herein, (collectively referred to as the "disclosure") generally concern digital signal processing techniques and digital signal processors (DSPs) implementing such techniques. More particularly but not exclusively, disclosed approaches for arranging data (and corresponding data structures) in connection with particular examples of digital signal processing techniques and DSPs can reduce the number of computations required to convolve a given signal, and thus can improve computational efficiency, reduce processing latency and, in particular instances, improve a user's audio experience. As but one particular example of innovative approaches for managing signal processing data to improve computational efficiency, innovative data structures are disclosed in connection with an approach for simulating multi-channel audio input signals (e.g., "surround sound" audio) to be played over a different number of audio output channels (e.g., two channels). Nonetheless, following a review of this disclosure and the innovative principles disclosed herein, those of ordinary skill in the art will appreciate the wide variety of data structures that can be used to improve computational efficiency of various digital signal processing techniques (e.g., in connection with other types of audio equipment, such as, for example, a beam-forming loudspeaker array, a crosstalk canceling stereo speaker, a multichannel echo canceller, and other systems involving real-time processing using a digital signal processor, such as, for example, wireless radios, stock market calculations, biomedical engineering measurements of nerve signals, to name but a small number of particular examples).

To aid the reader's understanding of one particular context in which disclosed memory management techniques and related systems can be used, the following is a brief overview of the fundamentals of spatial hearing, surround sound reproduction in rooms, and surround sound recording and mixing.

The earliest models of spatial hearing began with a simple model of the head as a sphere. This so-called "duplex theory," presented by Lord Rayleigh, described how the inter-aural level differences (ILD) and inter-aural time differences (ITD) of a single sound source at the two ears allowed a subject to localize the source in a horizontal plane. However, this model revealed two curiosities: (1) sources in front of the subject and behind the subject were mirror images that provided the same ITD and ILD cues (the "cone of confusion"), and (2) there was no explanation of how the height of a source was determined. These curiosities lead many researchers in the early 20th century to investigate and measure how sound propagated from a source in a room to the ear drum. They determined that the effects from the pinna (the outer ear), the neck and torso, hair, and other facial features dramatically affect the spatial impression of a sound source.

FIG. 1 shows a sound field 100 of a common 7.1 surround sound system, where a listener 105 is standing in the center of seven sound sources or loudspeakers 110. When a loudspeaker 110 emits sound in a room, the sound received by the auditory periphery (e.g., the ear) can be completely determined by the two impulse responses measured from the loudspeaker to each of the left and right ears. These are called the head-related impulse responses (HRIRs), or, when referenced in the frequency domain, the head-related transfer functions (HRTFs). They are traditionally defined from measurements in an anechoic (reflection free) room, so the effect of a listening environment is not included in the HRIR or HRTF. When measured in a room they are referred to as the binaural room impulse response (BRIR) or the binaural room transfer function (BRTF).

FIG. 2 illustrates exemplary head-related transfer functions (HRTFs) 215 for three sound sources 220 in an anechoic room 200, where HRTF 215a corresponds to the left ear and HRTF 215b corresponds to the right ear. For example, a first portion 225a of the left ear HRTF 215a and a first portion 225b of the right ear HRTF 215b correspond to a sound source 220a that is directly in front of the listener 205. Similarly, a second portion 227a of the left ear HRTF 215a and a second portion 227b of the right ear HRTF 215b correspond to a sound source 220b that is directly to the right of the listener 205. And a third portion 229a of the left ear HRTF 215a and a third portion 229b of the right ear HRTF 215b correspond to a sound source 220c that is directly to the left of the listener 205. As shown in FIG. 2, the HRTFs 215 are a function of the loudspeaker angle and the distance from the listener. FIG. 2 further illustrates that the sound source 220a in front of the listener arrives at each ear simultaneously. However, a sound arriving to the left or right of center (e.g., from sound sources 220b or 220c) will first arrive at the nearest ear and then be attenuated by the head causing a time delay and a difference in the frequency-dependent level at the farther ear. The HRTFs 215 may also vary with head orientation (because the angle between the source and the look direction changes) and from person to person (due to anatomical differences in head shape, pinna shape, ear canal shape, etc.) (not shown).

There are many complicated mechanical transduction processes and neural processes that will also affect the judgment of the location of a sound source including multimodal interactions between the visual and auditory systems and classification of the sound and environment. However, it is assumed herein that the user is provided with sufficient visual and environmental information that does not conflict with the spatial location of a sound source. Taking this standpoint, the following discussion is primarily concerned with the acoustic signal that is received by the ear drum.

When a sound source, such as a loudspeaker, is placed in a room, its radiated sound characteristics are altered by the boundaries of the room. At low frequencies (e.g., below 200-300 Hz in a living room size space), the sound radiation is coupled to the room. Much like a musical instrument, a room responds efficiently to a certain set of vibration frequencies. The amplitude of these vibrational modes varies with source and listener position within the room, making them a function of both frequency and position. At higher frequencies, the walls in the room behave like acoustic mirrors, reflecting, transmitting, and absorbing incoming sound. There is still modal behavior, but due to the sheer number of reflections, many of the modes will overlap making such analysis impractical. Thus, the sound field at high frequencies is usually described statistically and geometrically (like in optics) and not in terms of modes. In time, a sound emanating from an acoustic source travels at a speed of just over 1 foot per millisecond. Treating the walls as mirror-like reflectors, where the angle of incidence equals angle of reflection, one can easily draw the many sound paths from a source to the listener in a room. FIG. 3 shows the first few sound paths 302 from a single source 310 to a single listener 305 in a rectangular room 300, with the direct sound illustrated in green, the first reflections illustrated in red, and the second reflections illustrated in blue. A common way of describing the reflections in the room is by its reverberation time, or the time it takes for the loudest reflection to fall 60 dB below the direct sound (one-fourth to one-half second in small rooms and many seconds in concert halls).

While there is still an amount of work to be done on defining how to build a good sounding listening room, enough work has been done to make the process more of a science than an art. It is important to note that rooms add a significantly beneficial effect to both music and speech. For example, the complex interaction between a violin, with its spatially varying sound radiation pattern, and the symphony hall create a sense of envelopment and spaciousness that cannot be achieved if the same violin is played outdoors (where there are almost no reflections) or in an anechoic chamber. The same is true for rooms and multichannel sound reproduction.

The BS.1116-1 recommendations published by the International Telecommunication Union-Radiocommunications (ITU-R) on broadcasting service encapsulate a modern understanding of how to create a listening room. Firstly, the dimensions of the room need to be designed so that at low frequencies the room modes are well distributed in frequency to avoid issues at low frequencies. Secondly, the reverberation time should be in the range of 250-500 milliseconds (ms) (depending on room volume) and consistent across the frequency range. This can be done with appropriate placement of absorption and diffusion on the walls. Thirdly, there should be a larger amount of lateral reflections than front-back reflections. This creates a sense of envelopment necessary to convey the feeling of being in a space. Finally, the room must be quiet enough to convey the full dynamic range of the music being played back. Due to masking effects, the level of background noise dramatically affects the hearing function.

As explained more fully below, convolution computations, even in the frequency domain, can involve large data sets requiring a large number of multiply-add operations, particularly when filter lengths become long. Consequently, a need exists for efficient computational methods for use with signal processing. Similarly, a need exists for eliminating unnecessary multiply-add operations from convolution computations. And, in context of computer-implemented convolution, a need remains for reducing processing latency associated with the aforementioned large data sets and large number of multiply-add operations.

SUMMARY

The innovations disclosed herein overcome many problems in the prior art and address one or more of the aforementioned or other needs. In some respects, innovations disclosed herein are directed to methods for arranging data (and corresponding data structures) in memory to allow all parameters necessary for a given convolution operation to be simultaneously fetched from memory and thereby to reduce read and write traffic that otherwise could increase latency. Such methods combined with particular examples of digital signal processing techniques and DSPs can improve computational efficiency and/or reduce overall latency typically associated with such processing techniques and DSPs, improving real-time signal processing.

Methods of processing a signal are disclosed. A processor can be associated with a memory for storing data to be used in connection with one or more operations executed by the processor. A plurality of M filters from a corresponding plurality of M input channels to a selected one output channel can be provided, wherein each filter can be represented by a corresponding index, m. Each of the M filters can be partitioned into K respective filter partitions, wherein each respective filter partition can be represented by a corresponding index, k. A frequency-domain representation of each filter partition can be provided, wherein each frequency-domain representation of a filter partition comprises N frequency bins and a corresponding frequency-domain filter coefficient, wherein each respective frequency bin can be represented by a corresponding index, n. The frequency-domain representation of each filter partition can be stored in the memory in an arrangement suitable for the processor to concurrently receive, for each $n^{th}$ frequency bin, K groups of frequency-domain filter coefficients, wherein each $k^{th}$ group of frequency-domain filter coefficients in the concurrently received K groups of frequency-domain filter coefficients comprises the $k^{th}$ frequency-domain filter coefficient of each of the M filters corresponding to the $n^{th}$ frequency bin. A frequency-domain representation of K frames of an input signal from each of the M input channels can be stored in the memory, wherein each respective frame can be represented by a corresponding index, k, and each $k^{th}$ frame in the frequency-domain representation comprises N frequency bins and a corresponding frequency-domain signal coefficient. Each frequency-domain representation of each respective input-signal frame can be stored in the memory in an arrangement suitable for the processor to concurrently receive, for each $n^{th}$ frequency bin, K groups of frequency-domain signal coefficients, wherein each $k^{th}$ group of frequency-domain signal coefficients in the concurrently received K groups of frequency-domain signal coefficients comprises the $k^{th}$ frequency-domain signal coefficient of each of the M input signal frames corresponding to the $n^{th}$ frequency bin.

In some instances, the K groups of frequency-domain filter coefficients corresponding to a selected $n^{th}$ frequency bin and the K groups of frequency-domain signal coefficients corresponding to the selected $n^{th}$ frequency bin can be received from the memory. In some instances, the processor can perform one or more convolution operations among the K groups of frequency-domain filter coefficients corresponding to the selected $n^{th}$ frequency bin and the K groups of frequency-domain signal coefficients corresponding to the selected $n^{th}$ frequency bin received from the memory concurrently with receiving the K groups of frequency-domain filter coefficients corresponding to a selected $n^{th}$ frequency bin and the K groups of frequency-domain signal coefficients corresponding to the selected $n^{th}$ frequency bin can be received from the memory.

The K groups of frequency-domain filter coefficients corresponding to a selected different frequency bin and the K groups of frequency-domain signal coefficients corresponding to the selected different frequency bin can be received from the memory. One or more convolution operations among the K groups of frequency-domain filter coefficients corresponding to the selected different frequency bin and the K groups of frequency-domain signal coefficients corresponding to the selected different frequency bin received into the internal memory can be performed concurrently as the K groups of frequency-domain filter coefficients corresponding to the selected different frequency bin and the K groups of frequency-domain signal coefficients corresponding to the selected different frequency bin are received from the memory.

As well, one or more convolution operations among the K groups of frequency-domain filter coefficients corresponding to each respective one of the N frequency bins and the corresponding K groups of frequency-domain signal coefficients can be performed. A frame of an output signal can be synthesized from a result of the one or more convolution operations among the K groups of frequency-domain filter coefficients corresponding to each respective one of the N frequency bins and the corresponding K groups of frequency-domain signal coefficients. For example, the result of the one or more convolution operations among the K groups of frequency-domain filter coefficients corresponding to each respective one of the N frequency bins and the corresponding K groups of frequency-domain signal coefficients can be converted from a frequency-domain representation to a time-domain representation. As but one example, an overlap add of the time-domain representation of the result can be performed with an earlier frame of the output signal.

The K frames of the input signal can be converted from a time-domain representation to the frequency-domain representation. The input signal can comprise an analog signal. The analog signal can be discretized to define the K frames of the input signal in the time-domain representation. Each $k^{th}$ frame of the K frames of the input signal converted from the time-domain representation to the frequency-domain representation can be zero-padded to length N. As but one example of converting the K frames of the input signal, a Fast-Fourier Transform can be performed on each zero-padded $k^{th}$ frame of the input signal.

The selected one output channel can be a first output channel. The plurality of M filters from the corresponding plurality of M input channels to the first output channel can be a first plurality of M filters. A second plurality of M filters from the corresponding plurality of M input channels to a second output channel can be provided, wherein each in the second plurality of M filters can be represented by a corresponding index, m. Each of the second plurality of M filters can be partitioned into K respective filter partitions, wherein each respective filter partition can be represented by a corresponding index, k. A frequency-domain representation of each filter partition from the second plurality of M filters can be provided, wherein each frequency-domain representation of a filter partition from the second plurality of M filters comprises N frequency bins and a corresponding frequency-domain filter coefficient, wherein each respective frequency bin can be represented by a corresponding index, n. The frequency-domain representation of each filter partition from the second plurality of M filters can be stored in the memory in an arrangement suitable for the processor to concurrently receive, for each $n^{th}$ frequency bin, K groups of frequency-domain filter coefficients corresponding to the second plurality of M filters, wherein each $k^{th}$ group of frequency-domain filter coefficients in the concurrently received K groups of frequency-domain filter coefficients corresponding to the second plurality of M filters comprises the $k^{th}$ frequency-domain filter coefficient of each of the second plurality of M filters corresponding to the $n^{th}$ frequency bin.

In some instances, the memory comprises a memory external of the processor. The processor can receive from the external memory the K groups of frequency-domain filter coefficients corresponding to a selected $n^{th}$ frequency bin and the K groups of frequency-domain signal coefficients corresponding to the selected $n^{th}$ frequency bin. Concurrently, the processor can perform one or more convolution operations among the K groups of frequency-domain filter coefficients corresponding to the selected $n^{th}$ frequency bin and the K groups of frequency-domain signal coefficients corresponding to the selected $n^{th}$ frequency bin received from the external memory.

Digital signal processors are disclosed. A digital signal processor can include a processor and an associated memory, together with a plurality of M input channels and at least one output channel, as well as plurality of M filters from each of the M input channels to a selected one of the at least one output channel, wherein each filter can be represented by a corresponding index, m. Each of the M filters can include K respective filter partitions, wherein each respective filter partition can be represented by a corresponding index, k, and wherein a frequency-domain representation of each filter partition comprises N frequency bins and a corresponding frequency-domain filter coefficient, wherein each respective frequency bin can be represented by a corresponding index, n. The frequency-domain representation of each filter partition can be stored in the memory in an arrangement suitable for the processor to concurrently receive, for each $n^{th}$ frequency bin, K groups of frequency-domain filter coefficients. Each $k^{th}$ group of frequency-domain filter coefficients in the concurrently received K groups of frequency-domain filter coefficients can include the $k^{th}$ frequency-domain filter coefficient of each of the M filters corresponding to the $n^{th}$ frequency bin.

Such a digital signal processor can also include a signal processor associated with each of the M input channels. The signal processor can be configured to define a frequency-domain representation of each of K frames of an input signal from each of the M input channels. Each respective frame can be represented by a corresponding index, k, and each $k^{th}$ frame in the frequency-domain representation comprises N frequency bins and a corresponding frequency-domain signal coefficient. Each frequency-domain representation of each respective input-signal frame can be stored in the memory in an arrangement suitable for concurrently delivering to the processor, for each $n^{th}$ frequency bin, K groups of frequency-domain signal coefficients. Each $k^{th}$ group of frequency-domain signal coefficients in the concurrently delivered K groups of frequency-domain signal coefficients can include the $k^{th}$ frequency-domain signal coefficient of each of the M input signal frames corresponding to the $n^{th}$ frequency bin.

The processor and the memory can be so arranged as for the processor to receive from the memory the K groups of frequency-domain filter coefficients corresponding to a selected $n^{th}$ frequency bin and the K groups of frequency-domain signal coefficients corresponding to the selected $n^{th}$ frequency bin. The processor can further be configured to perform one or more convolution operations among the K groups of frequency-domain filter coefficients corresponding to the selected $n^{th}$ frequency bin and the K groups of frequency-domain signal coefficients corresponding to the selected $n^{th}$ frequency bin received from the memory concurrently with receiving from the memory the K groups of frequency-domain filter coefficients corresponding to a selected $n^{th}$ frequency bin and the K groups of frequency-domain signal coefficients corresponding to the selected $n^{th}$ frequency bin.

The processor and the memory can be further arranged so as for the processor to receive from the memory the K groups of frequency-domain filter coefficients corresponding to a selected different frequency bin and the K groups of frequency-domain signal coefficients corresponding to the selected different frequency bin.

The processor can also be configured to perform one or more convolution operations among the K groups of frequency-domain filter coefficients corresponding to the selected different frequency bin and the K groups of frequency-domain signal coefficients corresponding to the selected different frequency bin received into the internal memory concurrently with receiving from the memory the K groups of frequency-domain filter coefficients corresponding to the selected different frequency bin and the K groups of frequency-domain signal coefficients corresponding to the selected different frequency bin. In some embodiments, the processor can be further configured to perform one or more convolution operations among the K groups of frequency-domain filter coefficients corresponding to each respective one of the N frequency bins and the corresponding K groups of frequency-domain signal coefficients.

The processor can be configured to synthesize a frame of an output signal from a result of the one or more convolution operations among the K groups of frequency-domain filter coefficients corresponding to each respective one of the N frequency bins and the corresponding K groups of frequency-domain signal coefficients. For example, the processor, in some instances, can convert the result of the one or more convolution operations among the K groups of frequency-domain filter coefficients corresponding to each respective one of the N frequency bins and the corresponding K groups of frequency-domain signal coefficients from a frequency-domain representation to a time-domain representation to synthesize the frame of the output signal. Some processors are configured to perform an overlap add of the time-domain representation of the result with an earlier frame of the output signal to synthesize the frame of the output signal.

The signal processor can be configured to convert the K frames of the input signal from a time-domain representation to the frequency-domain representation. The input signal can be an analog signal, and the signal processor can be configured to discretize the analog signal and thereby define the K frames of the input signal in the time-domain representation. The signal processor can also be configured to zero-pad each $k^{th}$ frame of the input signal to length N. In some instances, the signal processor is also configured to perform a Fast-Fourier Transform on each zero-padded $k^{th}$ frame of the input signal.

The selected one output channel can be a first output channel, and the plurality of M filters from the corresponding plurality of M input channels to the first output channel comprises a first plurality of M filters. In some cases, the digital signal processor can also include a second plurality of M filters from the corresponding plurality of M input channels to a second output channel. Each in the second plurality of M filters can be represented by a corresponding index, m, and each of the second plurality of M filters can be partioned into K respective filter partitions. Each respective filter partition can be represented by a corresponding index, k, wherein a frequency-domain representation of each filter partition from the second plurality of M filters comprises N frequency bins and a corresponding frequency-domain filter coefficient, wherein each respective frequency bin can be represented by a corresponding index, n. The frequency-domain representation of each filter partition from the second plurality of M filters can be stored in the memory in an arrangement suitable for the processor to concurrently receive, for each $n^{th}$ frequency bin, K groups of frequency-domain filter coefficients corresponding to the second plurality of M filters, wherein each $k^{th}$ group of frequency-domain filter coefficients in the concurrently received K groups of frequency-domain filter coefficients corresponding to the second plurality of M filters comprises the $k^{th}$ frequency-domain filter coefficient of each of the second plurality of M filters corresponding to the $n^{th}$ frequency bin.

In some digital signal processors, the memory is a memory external of the processor. Even so, the processor and the memory can be so arranged as for the processor to receive from the external memory the K groups of frequency-domain filter coefficients corresponding to a selected $n^{th}$ frequency bin and the K groups of frequency-domain signal coefficients corresponding to the selected $n^{th}$ frequency bin.

And, the processor can be configured to perform one or more convolution operations among the K groups of frequency-domain filter coefficients corresponding to the selected $n^{th}$ frequency bin and the K groups of frequency-domain signal coefficients corresponding to the selected $n^{th}$ frequency bin received from the external memory concurrently with receiving from the external memory the K groups of frequency-domain filter coefficients corresponding to a selected $n^{th}$ frequency bin and the K groups of frequency-domain signal coefficients corresponding to the selected $n^{th}$ frequency bin.

Tangible, non-transitory computer-readable storage media are also described. Such computer readable media can contain instructions that, when executed, cause a processor to perform a method of processing a signal as disclosed herein.

Audio systems are also described. Such audio systems can include a digital signal processor as disclosed herein.

Other methods, articles of manufacture, features, and advantages will be, or will become, apparent to one having ordinary skill in the art upon examination of the following detailed description, which proceeds with reference to the accompanying drawings.

BRIEF DESCRIPTION OF THE DRAWINGS

Unless specified otherwise, the accompanying drawings illustrate aspects of the innovative subject matter described herein. Referring to the drawings, wherein like numerals refer to like parts throughout the several views and this specification, several embodiments of presently disclosed principles are illustrated by way of example, and not by way of limitation, wherein.

DETAILED DESCRIPTION

The following describes various innovative principles related to signal processing by way of reference to specific examples of digital signal processing techniques, and more particularly but not exclusively, to techniques for managing data sets, as well as read and write traffic from and to memory. Nonetheless, one or more of the disclosed principles can be incorporated in various other signal processing contexts to achieve any of a variety of corresponding system characteristics. Techniques and systems described in relation to particular configurations, applications, or uses, are merely examples of techniques and systems incorporating one or more of the innovative principles disclosed herein and are used to illustrate one or more innovative aspects of the disclosed principles.

This description is not provided to limit the invention to the embodiments described herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. Thus, methods and systems having attributes that are different from those specific examples discussed herein can embody one or more of the innovative principles, and can be used in applications not described herein in detail, for example, in communication systems, cell phones, systems having a plurality of antennas, such as, by way of example, wireless communications networks based on IEEE 802.11, or "WiFi," standards, systems having a plurality of sensors, other types of audio equipment, such as, for example, a beamforming loudspeaker array, a crosstalk canceling stereo speaker, a multichannel echo canceller, and other systems involving real-time processing using a DSP, such as, for example, other wireless radios, stock market calculations, biomedical engineering measurements of nerve signals, etc. Accordingly, such alternative embodiments also fall within the scope of this disclosure.

The following describes systems and methods for measuring, and recreating on a pair of headphones, the sound from many sources in a room (e.g., the loudspeakers in a 5.1 or 7.1 surround sound system), so that a listener experiences surround sound audio while using the headphones to listen to, for example, a movie, a live concert recording, a video game, or any other audio signal. While many of the examples provided herein are applied to headphones, the principles described in this application may be used with other types of audio equipment, such as a beamforming loudspeaker array, a crosstalk canceling stereo speaker, a multichannel echo canceller, etc., and for other types of real-time processing that utilizes a DSP chip, such as wireless radios, stock market calculations, biomedical engineering measurements of nerve signals, etc.

Figure 1:
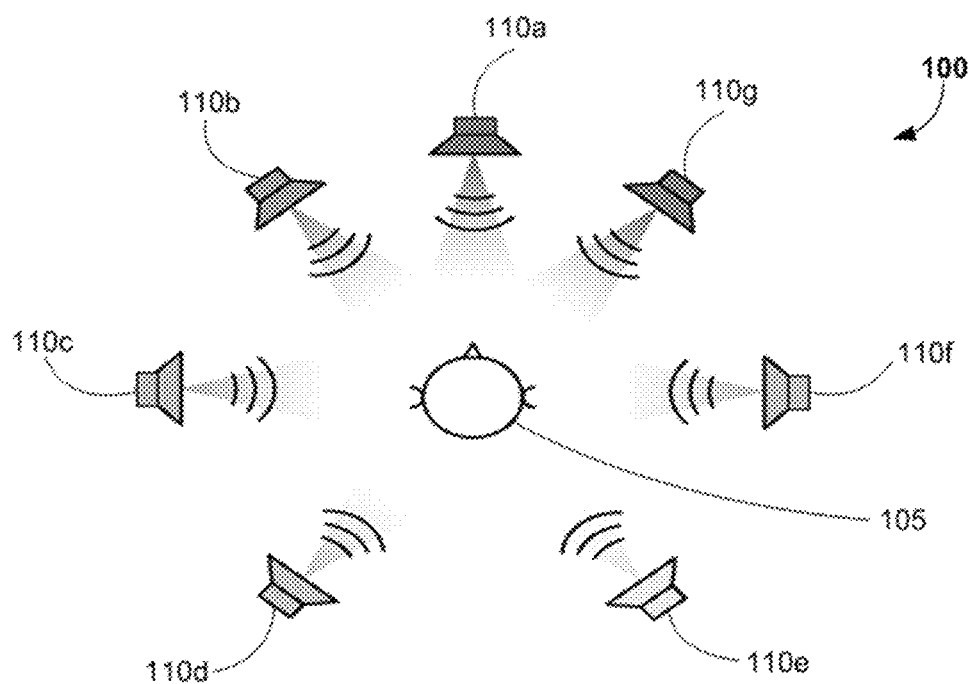
FIG. 1 illustrates a sound field of a conventional 7.1 surround sound system.
Figure 2:
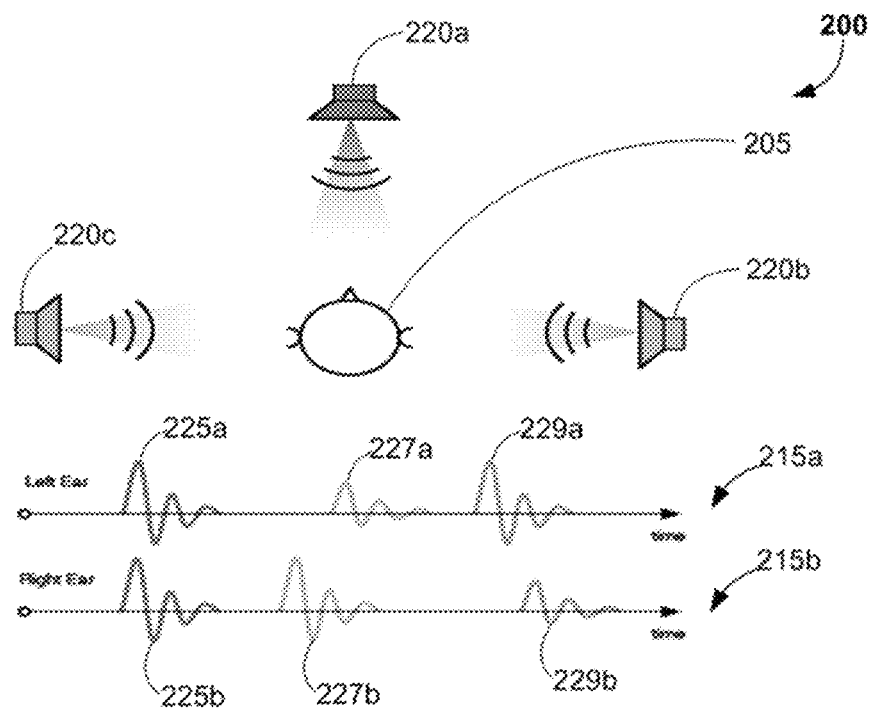
FIG. 2 illustrates exemplary head-related transfer functions (HRTF) in a conventional anechoic room.
Figure 3:
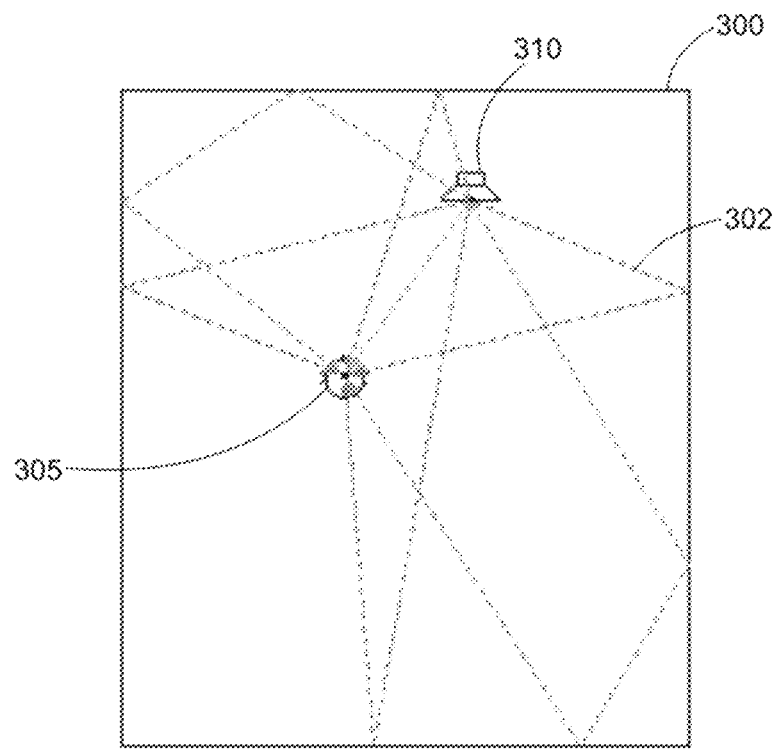
FIG. 3 illustrates several sound paths from a single source to a single listener in a conventional rectangular room.
Figure 4:
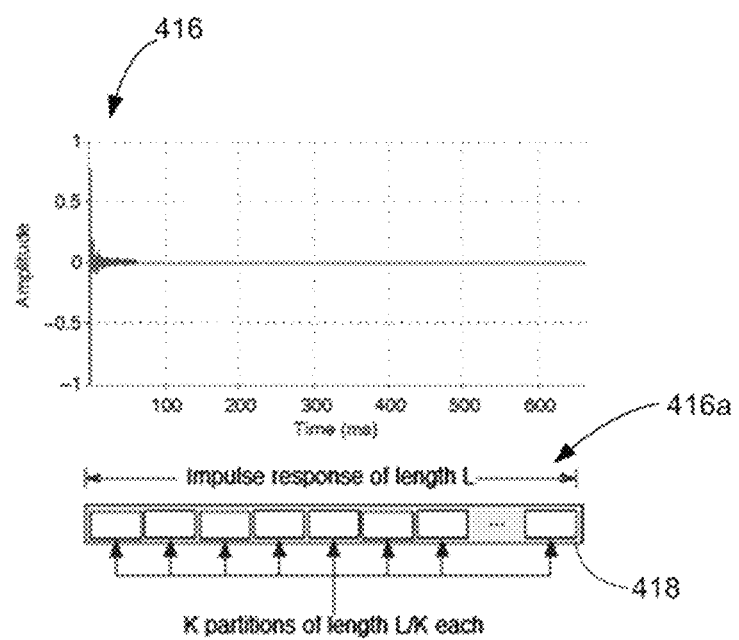
FIG. 4 illustrates an BRIR filter and a partitioned version of the BRIR filter when divided into K equal-length partitions.

Before discussing specific embodiments of the invention, however, a general signal processing framework for convolution will be described. To simulate the sound of a loudspeaker in a room on a pair of headphones, first, a set of small microphones is placed in the left and right ears of a subject, and then, the impulse response to each ear is measured by playing a swept sine wave or noise signal out of the loudspeaker. Thus, for each loudspeaker that is being simulated, two measurements (one for each ear) are taken. These impulse responses, called the BRIRs, contain all of the information about how the sound traveled to the measurement point (including room reflections and the HRIR). With this measurement in hand, a sound reproduced on a pair of headphones worn by a listener may be made to sound exactly the same as the loudspeaker in the room. FIG. 4 shows an example of one of these measurements for a single ear. Specifically, FIG. 4 illustrates a typical HRIR filter 416 and a partitioned version 416a of the HRIR filter when divided into K equal-length partitions 418.

Figure 5:
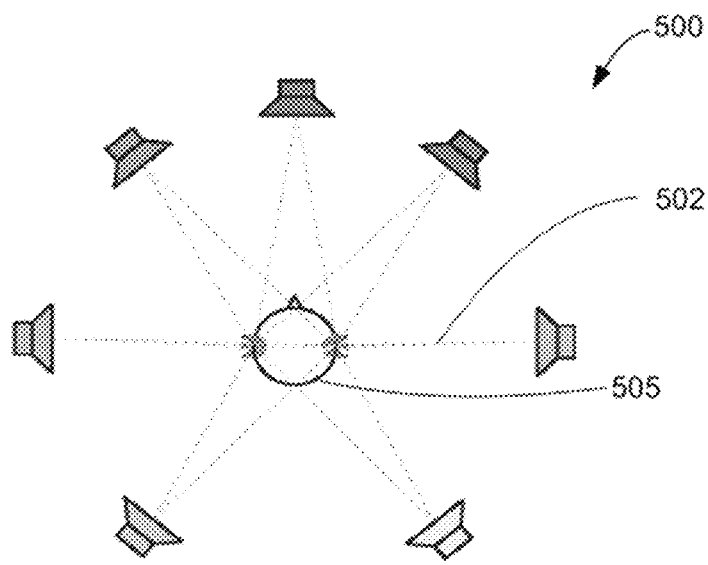
FIG. 5 illustrates several filter paths in a 7.1 surround sound system.

The operation of applying the BRIR to a sound, such as speech or music, is called convolution (explained in more detail below). Referring now to FIG. 5, upon reaching the ear drum of a listener 505, the separate sound fields 502 from multiple loudspeakers 510 in a room add together to produce a single audio signal. So, in order to reproduce the sound from, for example, a 5.1 or 7.1 surround sound system, the BRIRs for each loudspeaker 505 must be measured first. Then the sound sent to each speaker 505 (e.g., from a DVD or video game) is convolved with the left and right BRIRs and added together before playing them out of the headphones. This results in 12 convolutions for a 5.1 surround system or 16 convolutions for a 7.1 surround sound system 500 as shown in FIG. 5.

In a standard convolution computation, an FIR filter of length L/Fs seconds represented in the discrete time domain is given by $$h=[h(0),h(1),\ldots,h(L-1)]^T$$

where $F_s$ is the sample rate and L is the number of points in the HRIR filter. At time n, a data sequence of the last L values of x is constructed as $$x_L(n)=[x(n-L+1),x(n-L),\ldots,x(n)]^T.$$

The filtered output at a single time instance n can be written as the convolution $$y(n)=h^T x_L(n),$$

where $(\cdot)^T$ represents the vector transpose. Since convolution is a linear operation, it can be divided into multiple partitions in time and added together. FIG. 5 shows a typical HRIR filter and its partitioned version. The partitioned convolution can be written as $$y(n)=\Sigma h_k^T x_N(kN), \text{ with } k=0\to K-1$$

where k is the partition index, N=K/L is the partition size, and the partitions of the filter h are represented by $h_k$=[h(kN), h(kN+1), ..., h((k+1)N−1)]. It is assumed that L is evenly divisible by K, but it is a small effort to zero pad h so that the partitioning works for any K. It is also assumed a uniform partition size of L/K for simplicity of notation, but the technique can be easily extended to non-uniform partition sizes.

Conventional time-domain methods for filtering (IIR, FIR) are not computationally feasible when the filter lengths become long (e.g., when L is large). To perform the convolution computation more efficiently and quickly, Fast Fourier Transforms (FFTs) and the overlap-add (or overlap-save) method may be used, for example according to the method 600 depicted in FIG. 6. This fast convolution technique relies on the convolution theorem, $$x*h=F^{-1}\{f\{x*h\}\}=F^{-1}\{F\{x\}F\{h\}\},$$

which transforms the convolution into a simple multiplication in the frequency domain. In a discrete time system one can make use of the Fast Fourier Transform (FFT) and zero padding to perform arbitrary length Fourier transforms. Example MATLAB code for this, with arbitrary choice of filter and data length, L and M, is $$y=\mathit{ifft}(\mathit{fft}(x,N).*\mathit{fft}(h,N),N);$$

where N=L+M−1. A typical convolution operation requires L*M multiply-add operations per output point. With the FFT, this is reduced to $(3/2)\log_2 N+1$ multiply-adds per output point (assuming $(\frac{1}{2})N \log_2 N$ complexity of the FFT).

Figure 6:
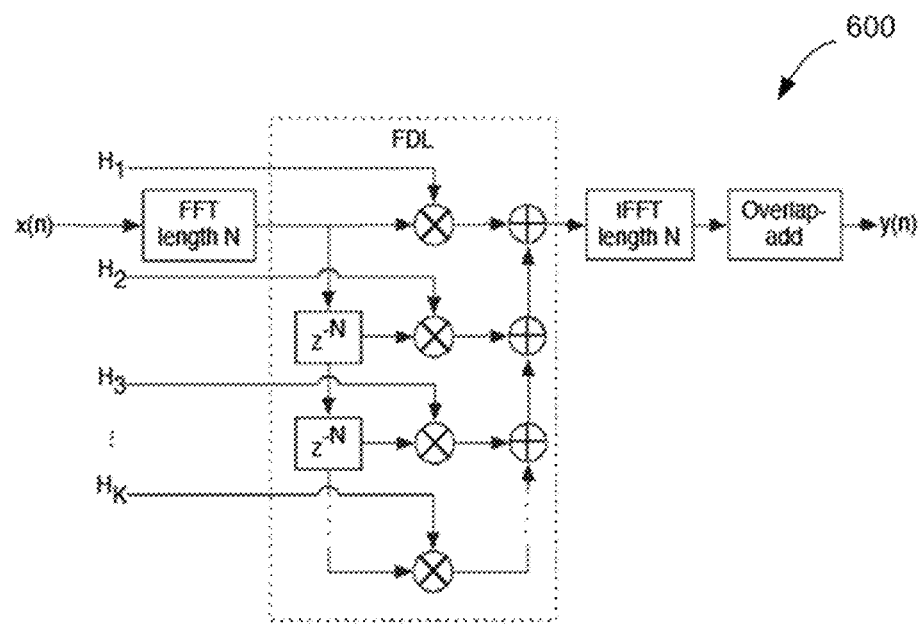
FIG. 6 schematically illustrates partitioned convolution in the frequency domain using overlap-add.

In FIG. 6, a $z^{-N}$ represents a delay of N samples. Also, the FFT of the portioned input filters $H, \ldots, H_k$ may be computed before processing has started, as these FFTs do not change. Further, note that the input is of length L, but both the FFT and the output are longer, length N. When operating in a digital signal processor (DSP) with a fixed block size of L points, the input data x must be zero-padded and the N-L extra output points in y must be saved and added into the next block of x. This is called the overlap-add technique. An alternative technique may be substituted for this called overlap-save which makes use of the circular convolution property. However, the complexity and memory requirements of both techniques are similar, so it is up to the implementer to choose one.

When N>>L, a lot of computational effort is wasted on performing long FFTs and complex multiplies on the zero padded input data. As represented schematically in FIG. 6, the fast convolution technique (overlap-add or overlap-save) can be combined with partitioned convolution to create a computational technique 600 which is efficient and has an arbitrary input-output latency. This may be referred to as a frequency delay line (FDL) because the last K blocks of frequency domain x data are stored and used in the next portioned convolution.

If a system has a block size of L, it can be shown that the choice of N=2 L is near optimal (although N=4 L may sometimes be a better choice). If L is a power of 2, this results in N as a power of 2 as well, allowing for efficient FFT implementations. System latency in this case is L samples.

Figure 7:
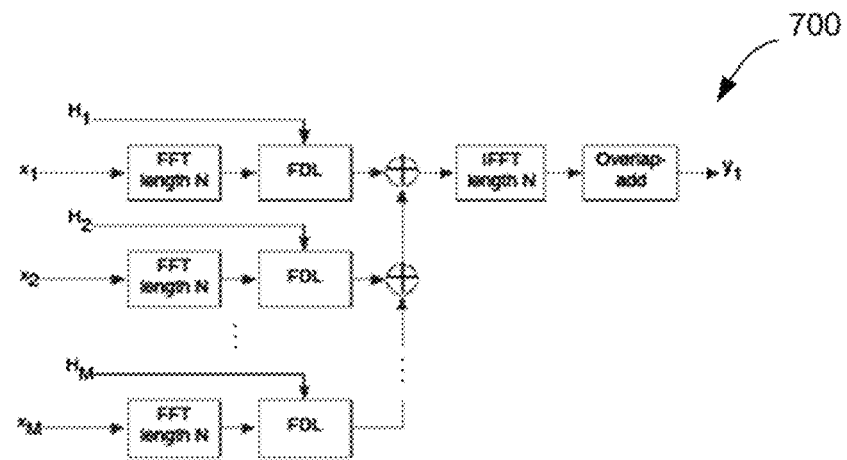
FIG. 7 schematically illustrates a multiple-input single-output (MISO) version of the convolution method represented by FIG. 6.

FIG. 7 schematically represents a multiple-input single-output (MISO) multiple inputs and y, is the single output. When implementing methods like the partitioned block-based convolution on a DSP one can make use of specialized functions such as single cycle multiply-accumulate functions (MACs), zero overhead looping, and pipelined ALUs. However, approaches such as these that require a lot of memory, there is a severe limit on speed caused by the memory interface to off-chip RAM (often times around one-third the clock speed of the DSP). That is, in a real hardware implementation, it is not only the CPU cycles for multiplying and adding data that matter, but the transfer of large sections of data between internal, fast, memory and one, or more, external, slow, memory units. One solution may be to organize multiply and add operations and memory load/stores appropriately to make best use of the processor for example, according to one embodiment, the load and store operations to external memory can be explicitly stated and organized in a way that balances the time spent on memory transfers with the CPU computations that can happen simultaneously. In particular, a "ping gong" structure can be used according to one embodiment to allow for one set of data to be operated on while the other is loading from memory. For Example, according to one embodiment, Algorithm 1 represents a fast and efficient partitioned convolution technique that is capable of balancing memory transfers with computational processing.

---

SUMMARY OF METHOD 1: Block-based partitioned convolution including an M to P channel downmix or up-mix having the following parameters:

Data: M channels of length L input data, $x_m$
Result: P channels of length L output data, $y_p$
N = length of FFT;
K = number of partitions;
ĥ = NxMxPxK partitioned filters;
ẋ= NxMxK partitioned input data.
START
    for each input channel, m, do:
        $X_m$ = zero pad $x_m$ to length N;
        $\dot{x}_m$ = FFT($X_m$);
        store $\dot{x}_m$ in external memory;
    end
    load ẋ(0), ĥ₀(0) ... ĥ$_p$(0) from external memory;
    for each frequency bin, n, do:
        load ẋ(n + 1), ĥ₀(n + 1) ... ĥ$_p$(n + 1) from external memory;
        for each output channel, p, do:
            $\hat{y}_p(n) = \dot{x}^T(n) * \hat{h}_p(n)$;
        end
        load ẋ(n + 2), h₀(n + 2) ... h$_p$(n + 2) from external memory;
        for each output channel, p, do:
            $Y_p(n + 1) = \dot{x}^T(n + 1) * \hat{h}_p(n + 1)$;
        end
    end
    for each output channel, p, do:
        $\hat{y}_p$ = IFFT($Y_p$);
        $y_p$ = overlap add $\hat{y}_p$ with last $\hat{y}_p$;
    end
END

---

Figure 8:
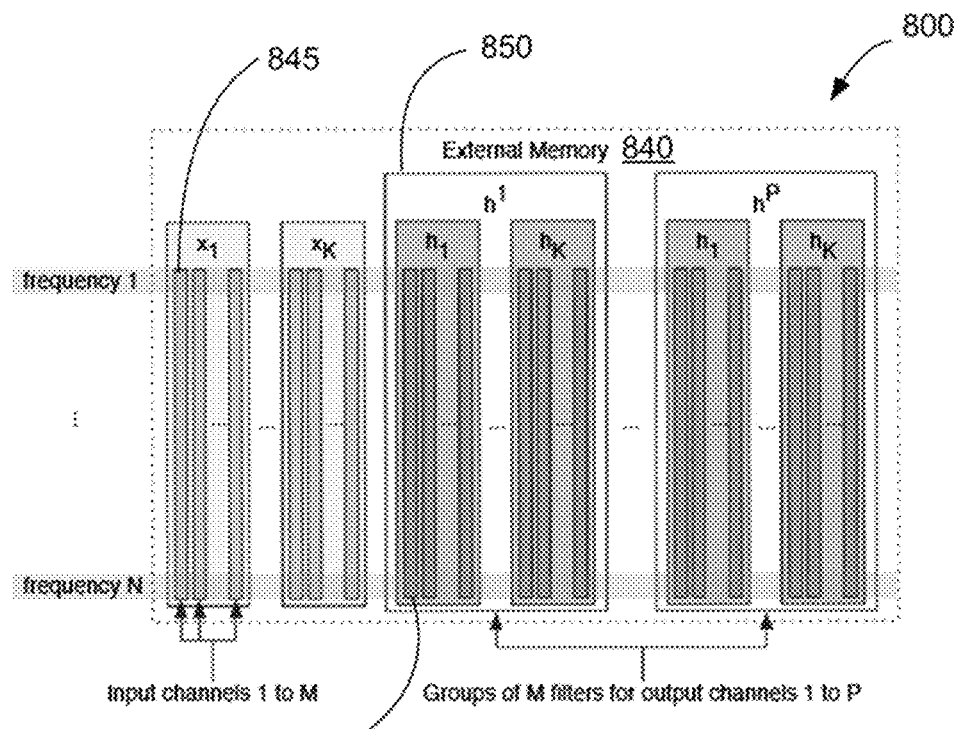
FIG. 8 illustrates a memory layout according to one embodiment.

For METHOD 1 to work, the memory layout becomes important. FIG. 8 shows an example memory layout 800 in which an external memory 840 can be organized to enable efficient transfers of data. Each column 845 represents the FFT data of a single channel (either input data or filter data). The filters 850 are shown in groups of M channels organized consecutively from partition 1 to K. Note that the ordering of the channels may not matter as long as the columns 845 of $x_k$ match the corresponding columns 845 of $h_k$ in each of the P filters 850.

The memory layout 800 shown in FIG. 8 also allows for efficient update of the x vectors. Every time a new frame of data comes in, the FFT of each input channel is performed and the partitions are stored into the external memory 840. Since the partitions in the x matrix need to match the partitions in the h's, the new data can be loaded in place of the $x_k$ value and the pointer to $x_1$ can be updated. This allows memory to be loaded and stored to external memory 840 without any sort of reordering. It requires a small modification to the pseudocode where the complex dot product is divided into two complex dot products: one for the 0 to $k_p$ partitions and one from $k_p+1$ to K. This should have little to no impact on computational complexity.

The above discussion includes the basic mechanisms of spatial hearing along with the modern representation of the source-to-ear transfer function, the HRIR. It was shown that for each loudspeaker in a room, the loudspeaker-room-ear transfer function can be measured at the left and right ears resulting in a BRIR. These BRIRs can then be used as filters with the loudspeaker driving signals (music, movies, etc.) to reproduce the listening experience using loudspeakers in the room on a pair of headphones. Using frequency domain filtering along with overlap-save or overlap-add and the partitioned convolution an efficient techniques for implementing long filters are described herein. While most measures of computational efficiency focus on the number of arithmetic operations, the real bottleneck for most systems operating on large data is the transfer speed between internal (fast) and external (slow) memory. Acknowledging this, a method for partitioned convolution is presented that achieves an efficient balance between memory transfers and computations (see Method 1).

While a 7.1 to binaural downmix method and system is presented herein, method 1 is presented in its generalized multiple-input multiple-output (MIMO) form. Therefore, the efficient processing described in this report can be used for many other applications that perform similar processing (i.e. a beamforming loudspeaker array, a crosstalk canceling stereo speaker, a multichannel echo canceller, etc.).

Figure 9:
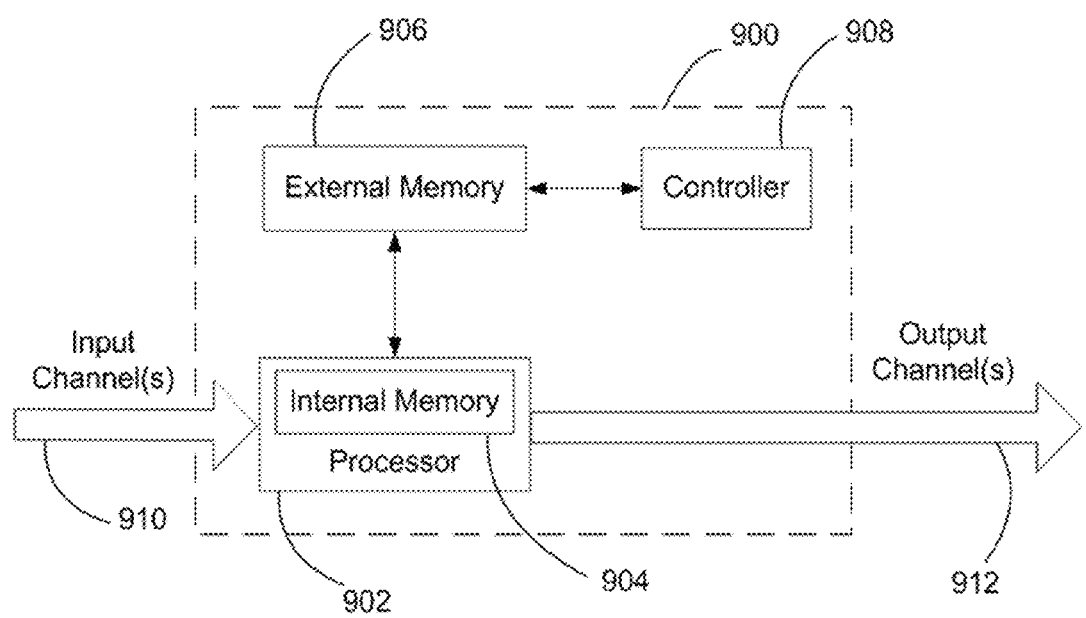
FIG. 9 illustrates an embodiment of a digital signal processing system disclosed herein.

FIG. 9 shows a signal processing system 900 according to one embodiment. The system 900 includes a processor 902 that can be configured to implement the METHOD 1. The processor 902 includes an internal memory 904 for storing data in connection with operations executed by the processor 902, for example, during implementation of the METHOD 1. The system 900 further includes an external memory 906 for storing data that is not being processed by the processor 902 at a given time. According to some embodiments, the system 900 can also include a controller 900 for controlling functions associated with the external memory 906, such as arrangement of data stored in the external memory 906. According to one embodiment, the controller 900 can be configured to implement the memory layout shown in FIG. 8 and described herein. The system 900 can receive a signal to be processed (e.g., an input signal x(n)) through one or more input channels 910. The input signal may be received from a signal generation device, an analog-to-digital converter, another signal processing component, or any other appropriate device. The input signal may be communicated to the processor 902 in the forms of blocks of samples of the input signal. After processing the input signal according to the techniques described herein, the system 900 can communicate an output signal (e.g., output signal y(n)) through one or more output channels 912 to one or more audio sources or other devices. One or more of the components of the system 900 can be implemented using any combination of hardware, software, or firmware operating on one or more computers at one or more locations. For example, in one embodiment, the processor 902 can be implemented in software and loaded and executed on a DSP, or any other appropriate component.

According to one embodiment, the signal processing system 900 can be configured to process a digital input signal using one or more filter. The filters may be long filters that are divided or partitioned into k partitions. Each filter may be associated with an output channel and have an impulse response that is partitioned into a plurality of impulse response partitions. The digital input signal may be divided into blocks of samples, each block being associated with an input channel. The number of output channels may be equal to, more than, or less than the number of input channels, depending on the type of input signal and the overall application of the system 900.

The external memory 906 may be configured to store a Fourier Transform of each partition of the impulse response of each filter. Each filter partition can include filter data that is associated with a plurality of frequency values. The filter data may be further divided in filter data sections, the number of sections being determined by the number of input channels 910. The external memory 906 may also be configured to store a Fourier Transform of each input signal block (or sample) of the digital input signal. The input signal block can include input data that is associated with a plurality of frequency values. The input data may be further divided into input data sections, the number of sections being determined by the number of input channels 910.

The controller 908 can be configured to arrange the storage of data in the external memory. For example, the controller 908 can be configured to arrange the storage of the Fourier Transform of each impulse response and each input signal block in the external memory 906. Further, the controller 908 can be configured to arrange the store of said data such that each input data section and each filter data section are aligned according to the frequency values associated with each.

The processor 902 can be further configured to load from the external memory 906 into the internal memory 904 portions of the filter data sections and the input data sections that correspond to a certain frequency value. This step may be taken for each output channel. The processor 902 can be configured to continue loading data from the external memory 906 into the internal memory 904 for each frequency until all of the data has been loaded into the internal memory 904. The processor 902 can be further configured to process previously-loaded data to obtain a frequency domain output, while performing the above loading. For example, while loading the data corresponding to frequency n+1, the processor 902 can process (e.g., perform convolution-related calculations, a dot product, etc.) data corresponding to frequency n to obtain a frequency domain output. This cycle, or ping-pong structure, can continue until the last chunk of data corresponding to the last frequency is processed and the last frequency domain output is obtained for each output channel. The processor 902 can then process the frequency domain outputs to obtain an output signal by, for example, performing an Inverse Fourier Transform of the frequency domain outputs.

More specifically, for each input signal block, the processor 902 can be configured to do the following:
(a) zero pad the input signal block to match the length of the FFT method;
(b) calculate a Fourier Transform of the input signal block using the FFT method; and
(c) transmit the Fourier Transform of the input signal block to the memory for storage, wherein each input signal block Fourier Transform comprises bundles of data and each bundle of data is associated with a respective one of the input channels, and wherein the controller is configured to arrange, in the memory, each input signal block Fourier Transform so that frequency values associated with each bundle of data are aligned with the frequency values associated with the sections of data of the impulse response Fourier Transforms. Further, the processor 902 can be configured to receive, from the memory, the Fourier Transforms of the zero-padded input signal blocks obtained in (a) and the impulse response Fourier Transforms that correspond in time to the zero-padded input signal blocks.

Further, the processor 902 can be configured to do the following for each frequency value associated with the bundles of data:
(i) receive, from the memory, a portion of each Fourier Transform of a first set of input signal blocks that corresponds to the given frequency value;
(ii) receive, from the memory, a portion of each Fourier transform of a first set of impulse response blocks that corresponds to the given frequency value, the first set of impulse response blocks corresponding in time to the first set of input signal blocks;

(iii) for each output channel, perform a convolution of the Fourier Transform portions of the first set of input signal blocks and the Fourier Transform portions of the first set of impulse response blocks to obtain a first set of spectral partitions;

(iv) receive, from the memory, a portion of each Fourier Transform of a second set of input signal blocks that corresponds to the given frequency value;

(v) receive, from the memory, a portion of each Fourier Transform of a second set of impulse response blocks that corresponds to the given frequency value, the second set of impulse response blocks corresponding in time to the second set of input signal blocks; and (vi) for each output channel, perform a convolution of the Fourier Transform portions of the second set of input signal blocks and the Fourier Transform portions of the second set of impulse response blocks to obtain a second set of spectral partitions.

Further, the processor 902 can be configured to do the following for each output channel:

(1) combine the first and second sets of spectral partitions obtained for each frequency value to create an output spectrum;

(2) perform an inverse FFT on the output spectrum to obtain a first output signal;

(3) overlap-add the first output signal with a second output signal to obtain a final output signal, the second output signal occurring earlier in time than the first output signal; and (4) provide the final output signal to the output channel.

The examples described above generally concern techniques for managing memory in context of large data sets and large computational loads arising from "real-time" digital signal processing and related systems. Other embodiments than those described above in detail are contemplated based on the principles disclosed herein, together with any attendant changes in configurations of the respective apparatus described herein.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The previous description of the disclosed embodiments is provided to enable any person skilled in the art to make or use the disclosed innovations. Those of ordinary skill in the art will appreciate that the exemplary embodiments disclosed herein can be adapted to various configurations and/or uses without departing from the disclosed principles. For example, the principles described above in connection with any particular example can be combined with the principles described in connection with another example described herein. Various modifications to those embodiments will be readily apparent to those skilled in the art, and the generic principles defined herein may be applied to other embodiments without departing from the spirit or scope of this disclosure. Accordingly, this detailed description shall not be construed in a limiting sense, and following a review of this disclosure, those of ordinary skill in the art will appreciate the wide variety of filtering and computational techniques can be devised using the various concepts described herein.

Similarly, the presently claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features described herein, including, for example, all that comes within the scope and spirit of the foregoing description and the combinations recited in the following claims, literally and under the doctrine of equivalents.

We currently claim:

1. A tangible, non-transitory computer-readable storage medium containing instructions that, when executed, cause a processor to perform a method of processing a signal, the method comprising:
    storing in a memory operatively coupled with the processor a frequency-domain representation of each of a plurality of filters from a corresponding plurality of input channels to a selected one output channel;
    arranging in the memory a frequency-domain representation of an input signal from each of the input channels in a manner suitable for the processor to receive from the memory, and concurrently perform a convolution operation among, a selected portion of each frequency-domain representation of the plurality of filters and a corresponding selected portion of the frequency-domain representation of the input signal.

2. A storage medium according to claim 1, wherein:
    each filter comprises an equal plurality of filter partitions, each filter partition corresponding to one filter partition in each of the other filters;
    the frequency-domain representation of each filter comprises a frequency-domain representation of each filter partition; and
    the selected portion from each respective frequency-domain representation of the plurality of filters comprises the frequency-domain representation of a selected filter partition from each filter, the selected filter partition from each filter corresponding to each of the other selected filter partitions.

3. A storage medium according to claim 1, wherein the act of arranging the frequency-domain representations of the filters and the input signal comprises arranging the frequency-domain representations of the filters and the input signal in a manner suitable for the processor to receive and concurrently to perform the convolution operation without writing an intermediate result of the convolution operation to the memory.

4. A storage medium according to claim 1, wherein the method further comprises synthesizing a frame of an output signal from a result of the convolution operation.

5. A storage medium according to claim 4, wherein the act of synthesizing the frame of the output signal comprises converting the result of the convolution operation from a frequency-domain representation to a time-domain representation.

6. A storage medium according to claim 5, wherein the act of synthesizing the frame of the output signal further comprises performing an overlap add of the time-domain representation of the result with an earlier frame of the output signal.

7. A storage medium according to claim 1, wherein the method further comprises converting the input signal from a time-domain representation to the frequency-domain representation of the input signal.

8. A storage medium according to claim 7, wherein the input signal comprises an analog signal, the method further comprising discretizing the analog signal to define a plurality of frames of the input signal in the time-domain representation.

9. A storage medium according to claim 8, wherein the act of converting the input signal from the time-domain representation to the frequency-domain representation comprises zero-padding each frame of the input signal in the time-domain representation to a common length.

10. A storage medium according to claim 9, wherein the act of converting the input signal comprises performing a Fast-Fourier Transform on each zero-padded frame of the input signal.

11. A storage medium according to claim 1, wherein the selected one output channel comprises a first output channel, and the plurality filters from the corresponding plurality of input channels to the first output channel comprises a first plurality of filters, the method further comprising
storing in the memory a frequency-domain representation of each of a second plurality of filters from the plurality of input channels to a second output channel.

12. A storage medium according to claim 11, wherein the method further comprises arranging the frequency-domain representation of each of the second plurality of filters in relation to the frequency-domain representation of each of the first plurality filters and in relation to the frequency-domain representation of the input signal from each of the input channels in a manner suitable for the processor to receive from the memory, and concurrently to perform a convolution operation among, a selected portion of each respective frequency-domain representation of the first plurality of filters and the corresponding frequency-domain representation of the input signal, and concurrently for the processor to receive from the memory, and concurrently perform a convolution operation among, a selected portion of each respective frequency-domain representation of the second plurality of filters and the corresponding frequency-domain representation of the input signal.

13. An audio system comprising a digital signal processor, comprising:
a processor and an associated memory;
a plurality of input channels and at least one output channel;
a filter from each of the input channels to a selected one of the at least one output channel;
wherein each of the filters comprises a respective plurality of filter partitions and each filter partition from a given filter corresponds to one other filter partition from each of the other filters,
wherein a frequency-domain representation of each filter partition is stored in the memory in an arrangement suitable for concurrently delivering to the processor corresponding portions of the frequency-domain representation of each in a group of corresponding filter partitions;
a signal processor associated with each of the input channels, wherein the signal processor is configured to define a frequency-domain representation of each of a plurality of frames of an input signal from each of the input channels, wherein each plurality of frames is equal in number to the plurality of filter partitions, and each frame corresponds to a selected filter partition from each filter, and wherein each frequency-domain representation of each respective input-signal frame is stored in the memory in an arrangement suitable for concurrently delivering to the processor a portion of the frequency-domain representation of each input-signal frame and the corresponding portions of the frequency-domain representation of each group of corresponding filter partitions.

14. An audio system according to claim 13, wherein the processor is configured to perform a convolution operation among the portion of the frequency-domain representation of each input-signal frame and the corresponding portions of the frequency-domain representation of each group of corresponding filter partitions.

15. An audio system according to claim 14, wherein the processor and the memory are further arranged so as for the processor to receive from the memory a different portion of the frequency-domain representation of each input-signal frame and corresponding different portions of the frequency-domain representation of each group of filter partitions corresponding to the respective input-signal frame.

16. An audio system according to claim 15, wherein the convolution operation comprises at least a first convolution operation, and the processor is further configured to perform at least a second convolution operation among the different portion of the frequency-domain representation of each input-signal frame and the corresponding different portions of the frequency-domain representation of each group of filter partitions corresponding to the respective input-signal frame.

17. An audio system according to claim 16, wherein the processor is configured to synthesize a frame of an output signal from a result of the at least first and the at least second convolution operations.

18. An audio system according to claim 17, wherein the processor is configured to convert the result of the at least first convolution operation from a frequency-domain representation to a time-domain representation to synthesize the frame of the output signal.

19. An audio system according to claim 18, wherein the processor is further configured to perform an overlap add of the time-domain representation of the result with an earlier frame of the output signal to synthesize the frame of the output signal.

20. An audio system according to claim 13, wherein the signal processor is configured to convert the plurality of frames of the input signal from a time-domain representation to the frequency-domain representation.

21. An audio system according to claim 20, wherein the input signal comprises an analog signal, and wherein the signal processor is configured to discretize the analog signal and thereby define the plurality of frames of the input signal in the time-domain representation.

22. An audio system according to claim 20, wherein the signal processor is further configured to zero-pad each of the frames of the input signal to a selected length.

23. An audio system according to claim 22, wherein the signal processor is further configured to perform a Fast-Fourier Transform on each zero-padded frame of the input signal.

24. An audio system according to claim 13, wherein the at least one output channel comprises a first output channel and a second output channel, the selected one output channel comprises the first output channel, and the plurality of filters from the corresponding plurality of input channels to the first output channel comprises a first plurality of filters, wherein the digital signal processor further comprises:
  a second plurality of filters from the corresponding plurality of input channels to the second output channel, wherein each of the second plurality of filters is partitioned into a plurality of respective filter partitions;
  wherein a frequency-domain representation of each filter partition from the second plurality of filters is stored in the memory in an arrangement suitable for delivering to the processor corresponding portions of the frequency-domain representation of each filter partition from the second plurality of filters concurrently with a portion of the frequency-domain representation of each input-signal frame and the corresponding portions of the frequency-domain representation of each group of corresponding filter partitions from the first plurality of filters.

* * * * *